United States Patent
Schmidt

[11] Patent Number: 5,641,205
[45] Date of Patent: Jun. 24, 1997

[54] APPARATUS FOR ADJUSTING THE DISTRIBUTION OF PRESSURE IN A VEHICLE SEAT BACKREST

[75] Inventor: Reinhard Schmidt, Lennestadt-Grevenbrück, Germany

[73] Assignee: R. Schmidt GmbH, Lennestadt, Germany

[21] Appl. No.: 588,964

[22] Filed: Feb. 12, 1996

[30] Foreign Application Priority Data

Feb. 17, 1995 [DE] Germany .................. 195 05 447.4

[51] Int. Cl.⁶ .................................................. A47C 7/46
[52] U.S. Cl. ........................ 297/284.7; 297/284.4
[58] Field of Search ............... 297/284.4, 284.7; 601/98, 99, 116

[56] References Cited

U.S. PATENT DOCUMENTS

| | | | |
|---|---|---|---|
| 2,756,809 | 7/1956 | Endresen | 297/284.7 |
| 4,541,670 | 9/1985 | Morgenstern et al. | 297/284.7 |
| 4,574,786 | 3/1986 | Hashimoto et al. | 601/99 |
| 4,632,454 | 12/1986 | Naert | 297/284.7 X |
| 4,730,871 | 3/1988 | Sheldon | 297/284.7 |
| 5,217,278 | 6/1993 | Harrison et al. | 297/284.7 |
| 5,335,965 | 8/1994 | Sessini | 297/284.78 |

FOREIGN PATENT DOCUMENTS 640877  1/1979  U.S.S.R. .................. 297/284.7

*Primary Examiner*—Peter R. Brown
*Attorney, Agent, or Firm*—Keck, Mahin & Cate

[57] ABSTRACT

An arrangement for adjusting the distribution of pressure on a support plate in a backrest of a vehicle seat for vertebral support, wherein a pressure-distribution element which is adjustable in respect of height and which is in the form of a rolling carriage assembly is disposed between the support plate and a pressure plate.

8 Claims, 4 Drawing Sheets

APPARATUS FOR ADJUSTING THE DISTRIBUTION OF PRESSURE IN A VEHICLE SEAT BACKREST

FIELD OF THE INVENTION

The invention concerns an arrangement for adjusting the distribution of pressure in a backrest of a vehicle seat for spinal column support and more especially for pelvic and/or lordosis support.

BACKGROUND OF THE INVENTION

An adjusting arrangement for lordosis support in a backrest of a motor vehicle seat is disclosed in DE 93 07 689 U1. To provide for distribution of the pressure involved in affording the spinal column support in that arrangement, a flat element such as a plate can be disposed in the backrest of the seat. That arrangement further includes an adjustable curved member which provides for adjustment of the distribution of pressure against the plate so that the effective support afforded by the plate can be adjusted to the correct location for the person using the seat.

SUMMARY OF THE INVENTION

An object of the present invention is to provide an improved arrangement for adjusting the distribution of pressure in a vehicle seat backrest for spinal column support.

A further object of the present invention is to provide an apparatus for adjusting the distribution of pressure at a support plate in a vehicle seat backrest for spinal column support in respect of height, which affords low-friction transmission of the adjusting movement to the support plate.

Yet another object of the present invention is to provide a vehicle seat backrest which includes an improved arrangement for adjusting the distribution of pressure for spinal column support, affording greater ease of operation and delicacy of adjustment.

In accordance with the principles of the present invention the foregoing and other objects are achieved by an arrangement for adjusting the distribution of pressure at a support plate in a backrest of a vehicle seat, for spinal column support, more particularly for example pelvic and/or lordosis support, wherein disposed between the support plate and a pressure plate which in use of the arrangement is mounted on the vehicle seat is a pressure-distribution element. The pressure-distribution element is adjustable in respect of height in relation to the seat.

In a preferred feature of the invention the height-adjustable pressure-distribution element is supported against the two plates, namely the support plate and the pressure plate, by way of rollers, so that the pressure-distribution element constitutes a kind of rolling carriage which can be displaced between the two plates upon adjustment in respect of height of the pressure-distribution element, for adjusting the position of spinal column support. For the heightwise adjustment the pressure-distribution element is preferably linearly guided between the two plates.

The rollers are preferably in the form of cylindrical rolling bodies. As an example in this respect the rollers can each be 120 mm in length and 10 mm in diameter.

In accordance with a preferred feature of the invention the arrangement may have at least first and second rollers for bearing against the support plate which can preferably be of a flexurally resilient nature. A single roller may be sufficient for the pressure-distribution element to be supported against the pressure plate. A preferred configuration of that nature therefore involves a three-roller support assembly, that is to say the pressure-distribution element is supported against the support plate by means of two rollers while it is supported against the pressure plate which is fixedly mounted to the vehicle seat frame structure by means of one roller.

It will be noted at this point that this manner of supporting the pressure-distribution element against the support plate, at a plurality of support locations as are afforded by at least the first and second rollers, contributes substantially to the avoidance of pressure peaks which could act on the back of the occupant of the vehicle seat by way of the support plate, in particular if the support plate is of a flexurally resilient nature.

The heightwise adjusting movement which is preferably produced manually, for example at an adjustment actuator, can be transmitted to the heightwise-adjustable pressure-distribution element by way of one or more Bowden cable assemblies, that is to say an assembly consisting of a control cable in a flexible for example steel conduit, which are appropriately connected to the pressure-distribution element. It will be appreciated that the heightwise adjustment movement may also be produced by a motor such as an electric motor.

In accordance with another preferred feature of the invention, the pressure plate is mounted on the vehicle seat in the backrest thereof adjustably in respect of depth, that is to say perpendicularly to the general plane of the backrest. That can provide for adjustment of the pressure plate in respect of depth, perpendicularly to the above-mentioned plane of the backrest. To achieve that aim the pressure plate can be mounted in the backrest frame structure pivotably at the upwardly disposed end of the pressure plate. In its lower part the pressure plate is suitably supported by a displaceable loop member such as a spring wire loop member. The pivotal movement of the pressure plate which is produced by the loop member provides for the movement that affords adjustment in respect of depth of the pressure plate. That depth adjustment movement is transmitted to the support plate from the pressure plate by way of the pressure-distribution element. The depth adjustment movement can also be produced manually.

Further objects, features and advantages of the present invention will be apparent from the following description of a preferred embodiment thereof.

DESCRIPTION OF THE PREFERRED EMBODIMENT

Figure 1:
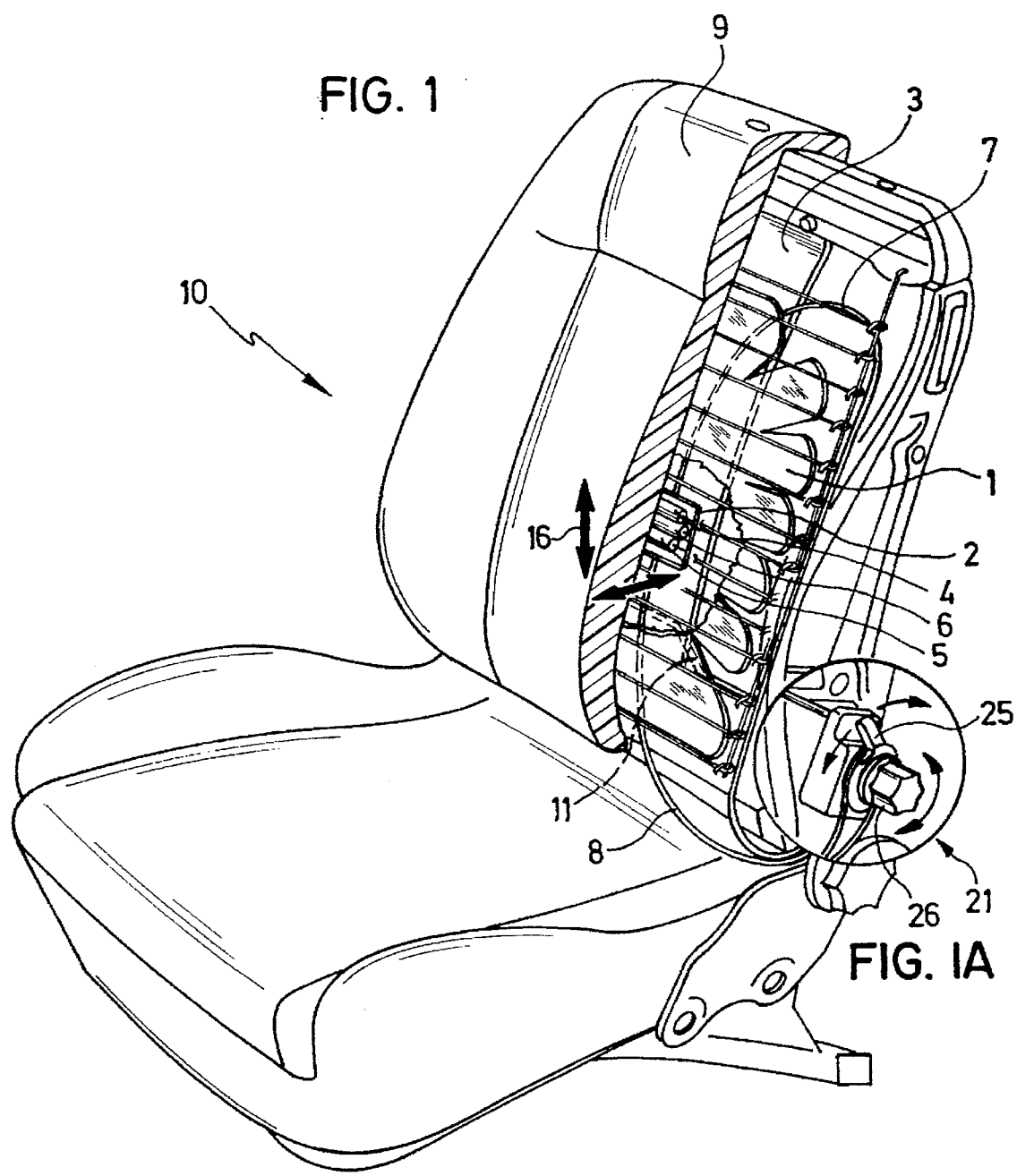
FIG. 1 is a perspective view of an embodiment of an arrangement according to the invention which is fitted in a backrest of a vehicle seat.

Referring firstly to FIG. 1, the illustrated embodiment of an arrangement for adjusting the distribution of pressure at a support plate in a backrest of a vehicle seat for spinal column support, for example and more particularly for pelvic and/or lordosis support, comprises a support plate 1 of flexurally resilient material, for example plastic material. The support plate 1 is disposed within the upholstery or cushioning of a backrest 9 of a vehicle seat which is indicated generally at 10. The support plate 1 serves for producing the desired distribution of pressure to the back of the seat occupant to afford the appropriate spinal column support required by that person. The support plate 1 is supported against a pressure plate 3 by way of a pressure-distribution element 2 in the form generally of a rolling carriage assembly. The pressure-distribution element 2 is adjustable in respect of height between the support plate 1 and the pressure plate 3. The pressure plate 3 is mounted pivotably in the backrest 9 of the vehicle seat 10. As can be seen from FIG. 2, the pivot axis for the pivotal movement of the pressure plate 3 in the backrest 9 is disposed in the upper part of the pressure plate 3, as diagrammatically indicated at 12. Disposed in the lower part of the pressure plate 3 is an adjusting loop member 11 in the form of a spring wire loop member. When the adjusting loop member 11 is adjusted that causes the pressure plate 3 to pivot about its axis 12 so as to provide for depth adjustment of the pressure plate 3, that is to say perpendicularly to the general plane of the backrest 9 of the seat 10, as indicated by the double-headed arrow 13 in FIG. 2. The depth adjustment is transmitted to the support plate 1 by way of the pressure-distribution element 2 which is disposed in the spacing between the support plate 1 and the pressure plate 3.

Figure 2:
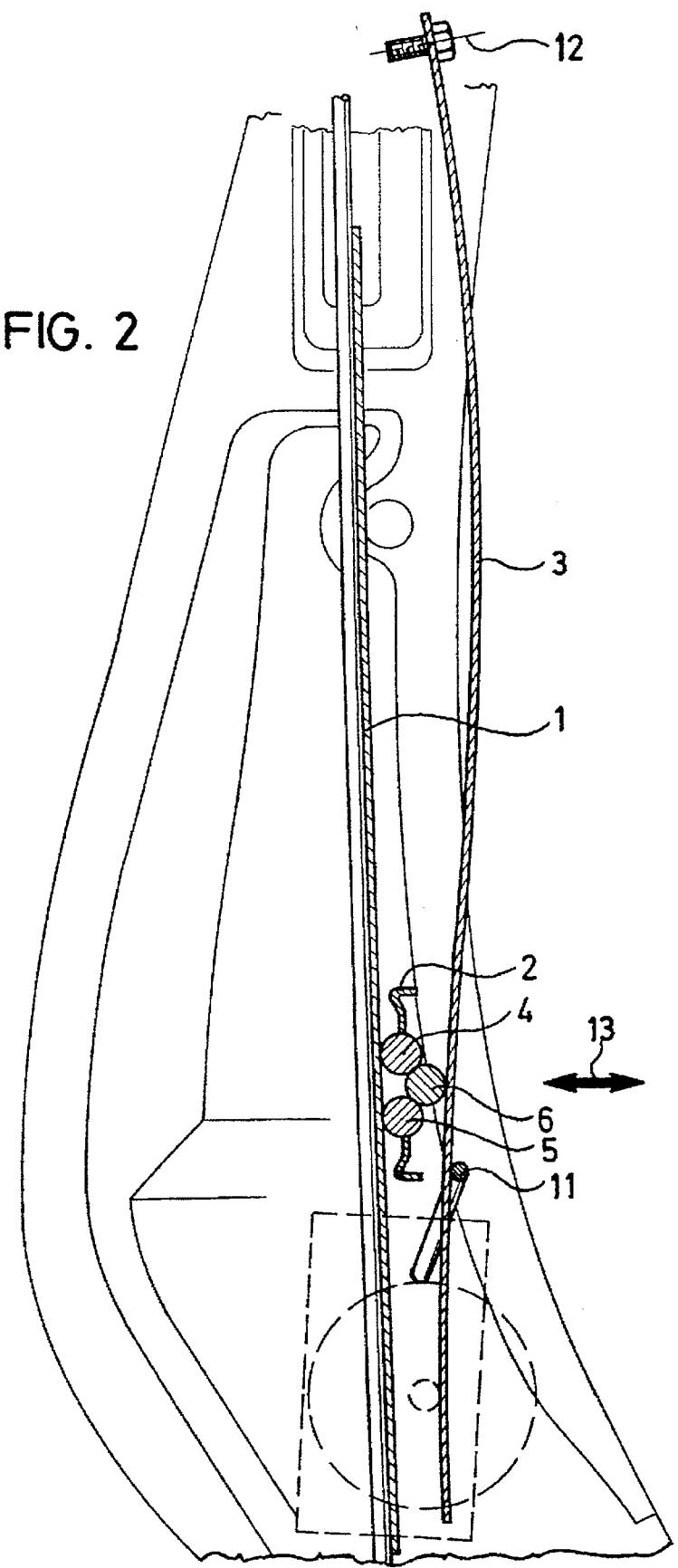
FIG. 2 is a simplified side view of the present embodiment of the invention.

Referring now also to FIG. 2 the pressure-distribution element 2 which is disposed adjustably in respect of height between the two plates, namely the support plate 1 and the pressure plate 3, is supported against the two plates 1 and 3 at rollers 4, 5 and 6. The rollers are in the form of cylindrical rolling bodies whose axes extend perpendicularly to the direction of heightwise adjustment of the pressure-distribution element 2 between the support plate 1 and the pressure plate 3. The use of the rollers in the pressure-distribution element 2 provides for low-friction adjustability in respect of height of the pressure-distribution element 2 between the two plates 1 and 3.

In the illustrated embodiment, as is most clearly seen from FIG. 2, the pressure-distribution element 2 is supported against the support plate 1 by means of first and second rollers 4 and 5, while it is supported against the pressure plate 3 by a third roller 6. That provides for a low-friction three-roller support configuration in relation to the support plate 1 and the pressure plate 3.

Figure 3:
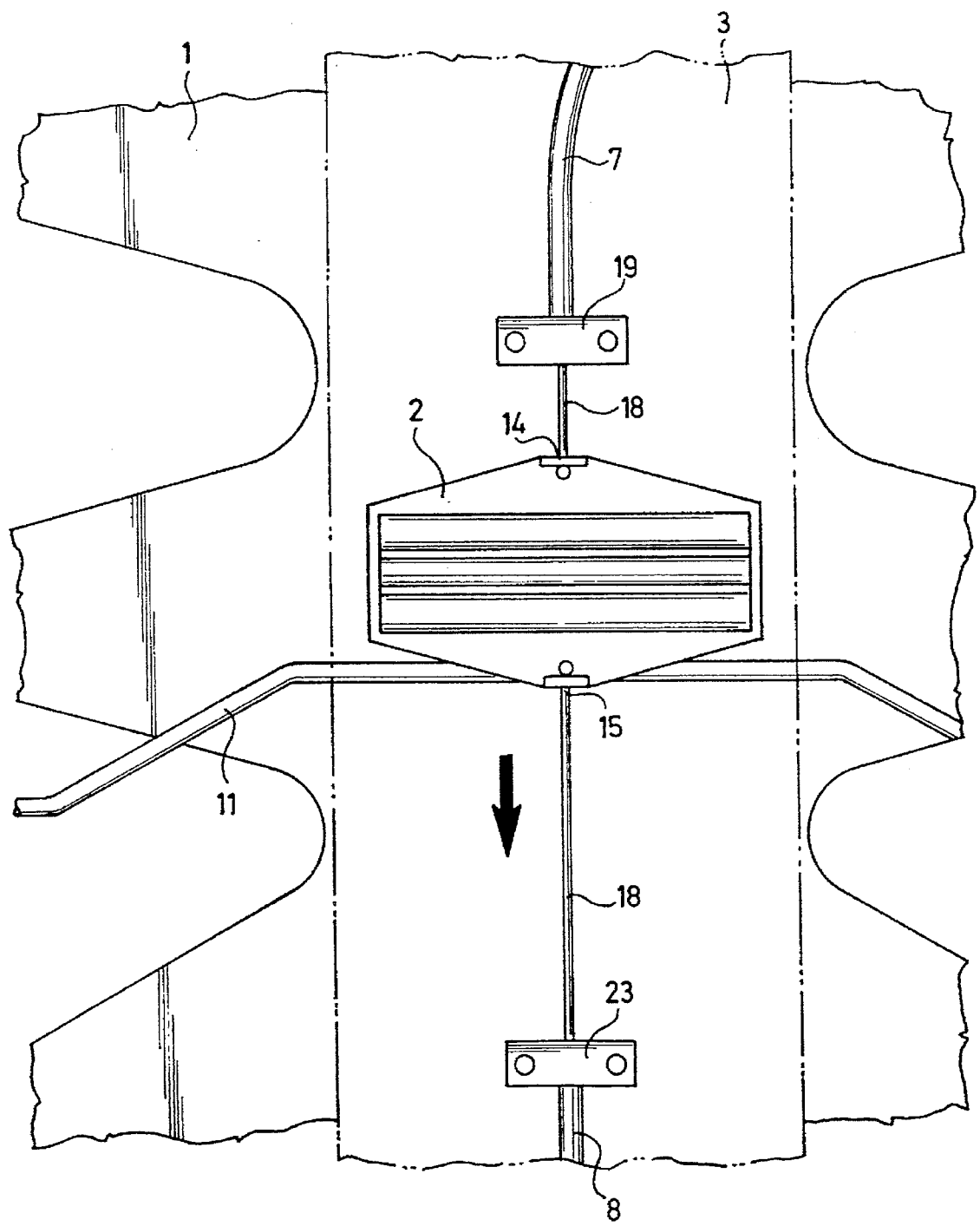
FIG. 3 is a front view of a part of the present embodiment of the invention.
Figure 5:
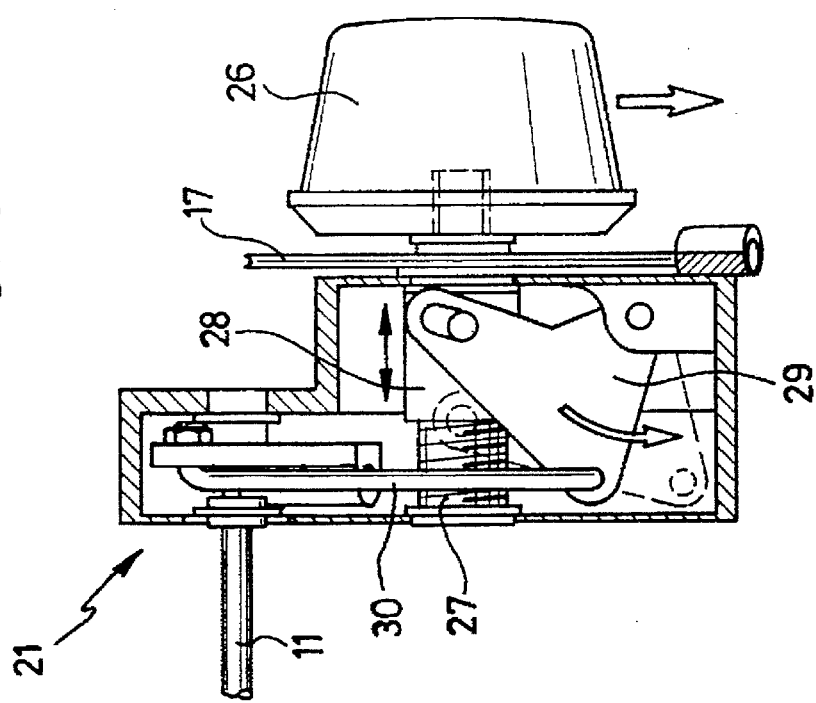
FIG. 5 is an adjustment actuator for depth adjustment.
Figure 4:
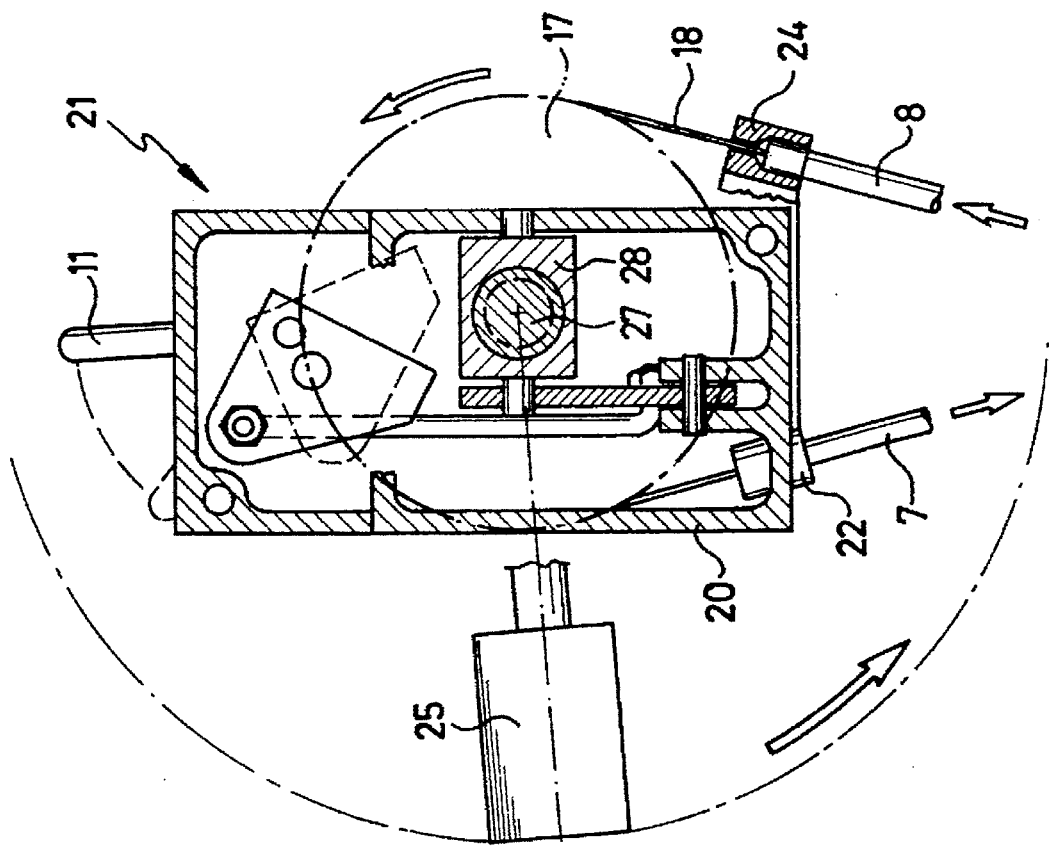
FIG. 4 is an adjustment actuator for heightwise adjustment.

The movement for heightwise adjustment, as indicated by the double-headed arrow 16 in FIG. 1, is transmitted to the pressure-distribution element 2 by first and second Bowden cable assemblies which are indicated at 7 and 8 in FIG. 1 and which are more clearly illustrated in FIGS. 3 through 5. The two Bowden cable assemblies 7 and 8 have in their flexible conduits a common pulling wire 18 which, as shown in FIG. 4, is passed around a cable pulley wheel 17. The two ends 14 and 15 of the common wire 18 are connected to the pressure-distribution element 2, as can be clearly seen from FIG. 3. One end of the flexible Bowden cable conduit of the upper Bowden cable assembly 7 is supported at a support location as indicated at 19 on the pressure plate 3. The other end of the flexible conduit of the upper Bowden cable assembly 7 is supported at a location which is fixed with respect to the seat, for example a housing 20 of the adjustment actuator 21 at a support location 22, as illustrated in FIG. 4. A flexible conduit of the lower Bowden cable assembly 8 is supported at a support location as indicated at 23 in FIG. 3 on the pressure plate 3. The other end of the flexible conduit of the lower Bowden cable assembly 8 is supported at a support location 24 which is fixed with respect to the seat, for example on the housing of the adjustment actuator 21.

In the illustrated embodiment adjustment in respect of height, as indicated by the double-headed arrow 16 in FIG. 1, is produced manually, by means of a hand lever 25. The hand lever 25 is connected to the cable pulley wheel 17 fixedly or by way of a step-up transmission assembly. The movement of the hand lever 25 is transmitted to the wire 18 and from there to the pressure-distribution element 2. When the hand lever 25, the cable pulley wheel 17 and the wire 18 are moved in the directions of movement indicated by the arrows in FIG. 4, the pressure-distribution element 2 is moved downwardly. When the directions of movement of the hand lever 25, the cable pulley wheel 17 and the wire 18 are reversed, the pressure-distribution element 2 is accordingly moved upwardly. The cable pulley wheel 17 is mounted rotatably on the housing 20 of the adjustment actuator 21 and transmits the pivotal movement of the hand lever 25 to the common wire 18 of the two Bowden cable assemblies 7 and 8.

In the illustrated embodiment the movement for depth adjustment, as indicated by the double-headed arrow 13 in FIG. 2 is also produced by hand. A hand wheel 26 of the adjustment actuator 21 is provided for that purpose. As shown in FIG. 5 the rotary movement of the hand wheel 26 is transmitted by way of a spindle 27 which has a trapezoidal screwthread and which is non-rotatably connected to the hand wheel 26, to a spindle nut 28 having a trapezoidal screwthread. The axial displacement of the spindle nut 28 is transmitted to the adjusting loop member 11 by way of a linkage 29 and a pushrod 30. As already described above the adjusting loop member 11 acts on the pressure plate 3 to pivot it about its pivot mounting axis 12 when providing for adjustment of the pressure plate 3 in respect of depth relative to the backrest of the seat in which the arrangement is fitted.

It will be appreciated that the above-described arrangement has been set forth solely by way of example and illustration of the principles of the present invention and that various modifications and alterations may be made therein without thereby departing from the spirit and scope of the invention.

What is claimed is:

1. A vehicle seat backrest comprising:
   a backrest support structure;
   a pressure plate pivotally mounted on a pivot axis to the backrest support structure so that the pivot axis, providing pivot movement of the pressure plate relative to the backrest support structure, is disposed in an upper part of the pressure plate;
   a support plate of flexurally resilient material, disposed adjacent to and at a spacing from the pressure plate, affording an appropriate spinal column support required by a seat occupant;
   a pressure-distribution element operatively disposed, in said spacing, between said support plate and said pressure plate;
   means for adjusting vertically a position of said pressure-distribution element between said pressure plate and said support plate; and
   adjusting means disposed at a lower part of the pressure plate for pivoting said pressure plate about said pivot axis so as to provide a forward adjustment which is transmitted to the support plate by said pressure-distribution element.

2. A vehicle seat backrest as set forth in claim 1 and further comprising roller means in said pressure-distribution element for supporting the pressure-distribution element between the support plate and the pressure plate.

3. A veicle seat backrest as set forth in claim 2 wherein the roller means include at least first and second rollers supporting the pressure-distribution element on the support plate.

4. A veicle seat backrest as set forth in claim 2 wherein the roller means include at least three rollers supporting the pressure-distribution element on the support plate and the pressure plate.

5. A vehicle seat backrest as set forth in claim 2 wherein the roller means comprises cylindrical rolling bodies, said pressure-distribution element being supported against said support plate by two of said rolling bodies and against said pressure plate by one of said rolling bodies.

6. A vehicle seat backrest as set forth in claim 1 wherein said means for adjusting vertically the position of the pressure distribution element includes Bowden cable means for transmitting movement to the pressure-distribution element.

7. A vehicle seat backrest as set forth in claim 1 wherein said means for adjusting vertically the position of the pressure-distribution element includes manually actuable means for producing vertical adjustment.

8. A vehicle seat backrest as set forth in claim 1 wherein said adjusting means includes manually actuable means for producing said forward adjustment.

* * * * *